(12) United States Patent
Dalmatov

(10) Patent No.: US 11,099,983 B2
(45) Date of Patent: Aug. 24, 2021

(54) CONSOLIDATING TEMPORALLY-RELATED DATA WITHIN LOG-BASED STORAGE

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 599 days.

(21) Appl. No.: 16/078,366

(22) PCT Filed: Apr. 27, 2017

(86) PCT No.: PCT/RU2017/000275
§ 371 (c)(1),
(2) Date: Aug. 21, 2018

(87) PCT Pub. No.: WO2018/199796
PCT Pub. Date: Nov. 1, 2018

(65) Prior Publication Data
US 2021/0191861 A1    Jun. 24, 2021

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0679* (2013.01); *G06F 2212/72* (2013.01)

(58) Field of Classification Search
None
See application file for complete search history.

(56) References Cited

U.S. PATENT DOCUMENTS 5,345,584 A   9/1994  Hill
5,734,861 A   3/1998  Cohn et al.
(Continued)

FOREIGN PATENT DOCUMENTS

WO    20160072971    5/2016

OTHER PUBLICATIONS

EMC, "EMC Celerra Automated Storage Tiering Applied Best Practices Guide", Aug. 2009, P/N h6499, pp. 1-36.
(Continued)

*Primary Examiner* — Jane Wei
(74) *Attorney, Agent, or Firm* — BainwoodHuang

(57) ABSTRACT

Technique manage data within computerized memory. The techniques involve, in response to receiving host data in a write cache, updating a data order log that holds order information indicating a temporal order for the host data. The temporal order initially is the order that the host data was received in the write cache. The techniques further involve transferring the host data from the write cache to secondary storage. The techniques further involve, after the host data is transferred from the write cache to secondary storage, providing a garbage collection service that consolidates the host data within the secondary storage in accordance with the data order log that holds the order information indicating the temporal order for the host data. With the temporal order of the host data generally preserved, data access operations may enjoy various optimizations such as improved prefetching, more sequential reads, improved auto-tiering, and so on.

20 Claims, 6 Drawing Sheets

(56) References Cited

U.S. PATENT DOCUMENTS

| | | |
|---|---|---|
| 6,173,306 B1 | 1/2001 | Raz et al. |
| 7,257,690 B1 * | 8/2007 | Baird .................. G06F 11/1471 |
| | | 707/999.202 |
| 8,706,960 B1 | 4/2014 | Ives et al. |
| 8,935,493 B1 | 1/2015 | Dolan et al. |
| 9,311,002 B1 | 4/2016 | Scott et al. |
| 9,330,105 B1 | 5/2016 | Duprey et al. |
| 9,383,940 B1 | 7/2016 | Ives et al. |
| 9,594,514 B1 | 3/2017 | Bono et al. |
| 9,684,593 B1 | 6/2017 | Chen et al. |
| 9,703,664 B1 | 7/2017 | Alshawabkeh et al. |
| 9,940,033 B1 | 4/2018 | Alshawabkeh et al. |
| 9,965,218 B1 | 5/2018 | Martin et al. |
| 10,025,523 B1 | 7/2018 | Dagan et al. |
| 10,073,621 B1 | 9/2018 | Foley et al. |
| 10,078,569 B1 | 9/2018 | Alshawabkeh et al. |
| 10,089,026 B1 | 10/2018 | Puhov et al. |
| 10,095,425 B1 | 10/2018 | Martin |
| 10,126,988 B1 | 11/2018 | Han et al. |
| 10,140,041 B1 | 11/2018 | Dong et al. |
| 10,146,447 B1 | 12/2018 | Dong et al. |
| 10,146,456 B1 | 12/2018 | Gao et al. |
| 10,146,459 B1 | 12/2018 | Gao et al. |
| 10,146,624 B1 | 12/2018 | Gong et al. |
| 10,146,646 B1 | 12/2018 | Foley et al. |
| 10,152,254 B1 | 12/2018 | Kang et al. |
| 2002/0095532 A1 | 7/2002 | Surugucchi et al. |
| 2003/0065883 A1 | 4/2003 | Bachmat |
| 2006/0161807 A1 | 7/2006 | Dawkins |
| 2006/0212746 A1 | 9/2006 | Amegadzie et al. |
| 2008/0028164 A1 | 1/2008 | Ikemoto et al. |
| 2008/0059749 A1 | 3/2008 | Gerber et al. |
| 2008/0109601 A1 | 5/2008 | Klemm et al. |
| 2010/0250501 A1 | 9/2010 | Mandagere et al. |
| 2011/0258391 A1 * | 10/2011 | Atkisson ............. G06F 12/0804 |
| | | 711/118 |
| 2012/0259901 A1 | 10/2012 | Lee et al. |
| 2013/0275653 A1 | 10/2013 | Ranade et al. |
| 2014/0095439 A1 | 4/2014 | Ram |
| 2015/0134926 A1 | 5/2015 | Yang et al. |
| 2016/0188401 A1 | 6/2016 | Shen et al. |
| 2016/0364149 A1 | 12/2016 | Klemm et al. |
| 2017/0285972 A1 | 10/2017 | Dalmatov |

OTHER PUBLICATIONS

EMC, "EMC VNX@ Unified Best Practices for Performance Applied Best Practice Guide", Oct. 2005, P/N H10938.8, pp. 1-37.

EMC, "Managing Data Relocation in Storage Systems", U.S. Appl. No. 13/929,664, filed Jun. 27, 2013.

Tomek, "EMC VNX-FAST VP Explained—Storage Freak", retrieved from http://www.storagefreak.net/2014/06/emc-vnx-fast-vp-explained, Jun. 2, 2014, pp. 1-6.

International Search Report and the Written Opinion from International Searching Authority (RU) for International Application No. PCT/RU2017/000275, dated Nov. 9, 2017, 7 pages.

* cited by examiner

CONSOLIDATING TEMPORALLY-RELATED DATA WITHIN LOG-BASED STORAGE

BACKGROUND

A conventional log-structured data storage system writes data into a sequential structure called a log which is stored in non-volatile memory. That is, the log is divided into a series of segments of equal size and, when the log-structured data storage system receives enough data to write a full segment, the log-structured data storage system writes that data into the next unoccupied segment. If any portion of that data had been written to an earlier-written segment in the series, the log-structured data storage system invalidates that portion of data in the earlier-written segment.

If all of the portions of data in an earlier-written segment become invalidated, the log-structured data storage system considers that earlier-written segment no longer occupied (i.e., unoccupied) and available for reuse. Additionally, the log-structured data storage system proactively combines valid data from partially-used segments (i.e., segments holding some valid portions of data and some invalidated portions of data) and stores the combined valid data in the next unoccupied segments thus freeing those partially-used segments for reuse.

Once the log-structured data storage system has written data to all of the segments in the log, the log-structured data storage system wraps around to the beginning of the series. The log-structured data storage system then writes data to the earlier-used segments which are now unoccupied and available for reuse.

SUMMARY

Unfortunately, there are deficiencies to the above-described conventional log-structured data storage system. For example, the process of proactively combining valid data from partially-used segments and storing the combined valid data in new unoccupied segments tends to mix data that has little or no relation. Accordingly, more time and work is required later on to access that data, e.g., more non-sequential reads, more subsequent fragmentation, more work to defragment subsequently fragmented data, etc.

In contrast to the above-described conventional log-structured data storage system which tends to mix data that has little or no relation, improved techniques involve consolidating valid data that is temporally-related. To this end, data blocks belonging to the same time period (i.e., data blocks received around the same time) are purposefully gathered and placed together by a garbage collection service. Such operation may be based on a set of records that initially tracks the blocks using the order that the blocks were initially received and then attempts to keep the blocks together in subsequent consolidation operations over time. Such operation leads to greater efficiencies and optimizations such as more sequential reads, improved prefetching, less fragmentation, and so on. Moreover, such operation provides improvement to other services such as deduplication, auto-tiering, etc.

One embodiment is directed to a method of managing data within computerized memory. The method includes, in response to receiving host data in a write cache, updating a data order log that holds order information indicating a temporal order for the host data. The temporal order initially is the order that the host data was received in the write cache. The method further includes transferring the host data from the write cache to secondary storage. The method further includes, after the host data is transferred from the write cache to secondary storage, providing a garbage collection service that consolidates the host data within the secondary storage in accordance with the log that holds the order information indicating the temporal order for the host data.

In some arrangements, the method further includes, before the host data within the secondary storage is consolidated, modifying at least some of the host data that was transferred from the write cache to the secondary storage. Accordingly, consolidation is able to withstand updates to the data as the data is modified over time.

In some arrangements, the secondary storage performs log-based storage of the host data. In these arrangements, transferring the host data from the write cache to secondary storage includes storing the host data within a first set of storage locations of the secondary storage. Additionally, modifying at least some of the host data that was transferred from the write cache to the secondary storage includes (i) modifying particular portions of the host data stored within the first set of storage locations of the second secondary storage to form modified portions of the host data, (ii) writing the modified portions of the host data to a second set of storage locations of the secondary storage that is different from the first set of storage locations, and (iii) invalidating the particular portions of the host data stored within the first set of storage locations of the second secondary storage.

In some arrangements, after the particular portions of the host data stored within the first set of storage locations are invalidated, the first set of storage locations continues to store other portions of the host data that are still valid. In these arrangements, providing the garbage collection service includes consolidating the other portions of the host data that are still valid into consolidated portions of the host data within a third set of storage locations of the secondary storage. The consolidated portions of the host data includes the other portions of the host data that are still valid ordered in accordance with the temporal order.

In some arrangements, consolidating the other portions of the host data that are still valid into the consolidated portions of the host data within the third set of storage locations includes reading at least some of the order information from the data order log and, based on the order information read from the data order log, forming the consolidated portions of the host data from the other portions of the host data that are still valid. Accordingly, the garbage collection service is able to place data together that was ingested during the same time period.

In some arrangements, consolidating the other portions of the host data that are still valid into the consolidated portions of the host data within the third set of storage locations further includes writing the consolidated portions of the host data to the third set of storage locations of the secondary storage, and invalidating the other portions of the host data from the first set of storage locations. Such operation makes earlier-used storage locations available for reuse (e.g., frees up memory in log-based storage).

In some arrangement, the method further includes, in response to the consolidated portions of the host data being written to the third set of storage locations of the secondary storage, updating the data order log that holds order information indicating the temporal order for the host data. The updated temporal order is the order that the consolidated portions of the host data were written to the third set of storage locations of the secondary storage. In some embodiments, such updating enables the data order log to locate the host data as it moves among log-based storage locations.

In some arrangements, the secondary storage includes a first storage tier that provides data access at a first data access speed and a second storage tier that provides data access at a second data access speed that is different from the first data access speed. In these arrangements, the first set of storage locations may reside within the first storage tier, and the third set of storage locations may reside within the second storage tier.

In some arrangements, the data order log includes multiple entries. Each entry of the data order log identifies (i) a respective storage location of the first set of storage locations, the second set of storage locations, and the third set of storage locations and (ii) a place within the temporal order for that respective storage location.

In some arrangements, each storage location of the first set of storage locations, the second set of storage locations, and the third set of storage locations is equal in size. In these arrangements, the respective storage location identified by each entry of the data order log may be identified by an address of the respective storage location.

In some arrangements, the storage locations of the first set of storage locations, the second set of storage locations, and the third set of storage locations are varying in size. In these arrangements, the respective storage location identified by each entry of the data order log may be identified by a starting address and an ending address of the respective storage location.

In some arrangements, the write cache and the secondary storage form at least a portion of a memory subsystem of a data storage assembly. In these arrangements, the method may further comprise delivering electronic results to a set of host computers in response to input/output (I/O) requests sent by the set of host computers to the data storage assembly to access the host data from the data storage assembly.

In some arrangements, the write cache receives and stores the host data in a log-based manner. Along these lines, the write cache may be formed by a portion of primary (or main) memory that is further used for other operations, e.g., holding executable code, maintaining metadata, caching read data, etc.

Another embodiment is directed to data storage equipment which includes a communications interface. The data storage equipment further includes memory having, among other things, a write cache, a data order log, and secondary storage. The data storage equipment further includes control circuitry coupled to the communications interface and the memory. The memory stores instructions which, when carried out by the control circuitry, cause the control circuitry to:
  (A) in response to receiving host data in the write cache through the communications interface, update the data order log which holds order information indicating a temporal order for the host data, the temporal order initially being the order that the host data was received in the write cache,
  (B) transfer the host data from the write cache to secondary storage, and
  (C) after the host data is transferred from the write cache to secondary storage, provide a garbage collection service that consolidates the host data within the secondary storage in accordance with the log that holds the order information indicating the temporal order for the host data.

Yet another embodiment is directed to a computer program product having a non-transitory computer readable medium which stores a set of instructions to manage data within computerized memory. The set of instructions, when carried out by computerized circuitry, causes the computerized circuitry to perform a method of:
  (A) in response to receiving host data in a write cache, updating a data order log that holds order information indicating a temporal order for the host data, the temporal order initially being the order that the host data was received in the write cache;
  (B) transferring the host data from the write cache to secondary storage; and
  (C) after the host data is transferred from the write cache to secondary storage, providing a garbage collection service that consolidates the host data within the secondary storage in accordance with the log that holds the order information indicating the temporal order for the host data.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in consolidating temporally-related data within log-based storage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to consolidating valid data that is temporally-related. Along these lines, data blocks belonging to the same time period (i.e., data blocks received around the same time) are purposefully collected and located together by a garbage collection service. Such operation may be based on a set of records that initially tracks the blocks using the order that the blocks were initially received, and then attempts to keep the blocks together in subsequent consolidation operations. Such operation further leads to greater efficiencies and optimizations such as more sequential data reads, improved data prefetching, less data fragmentation, and so on. Moreover, such operation provides improvement to other services such as deduplication, auto-tiering, and so on.

Figure 1:
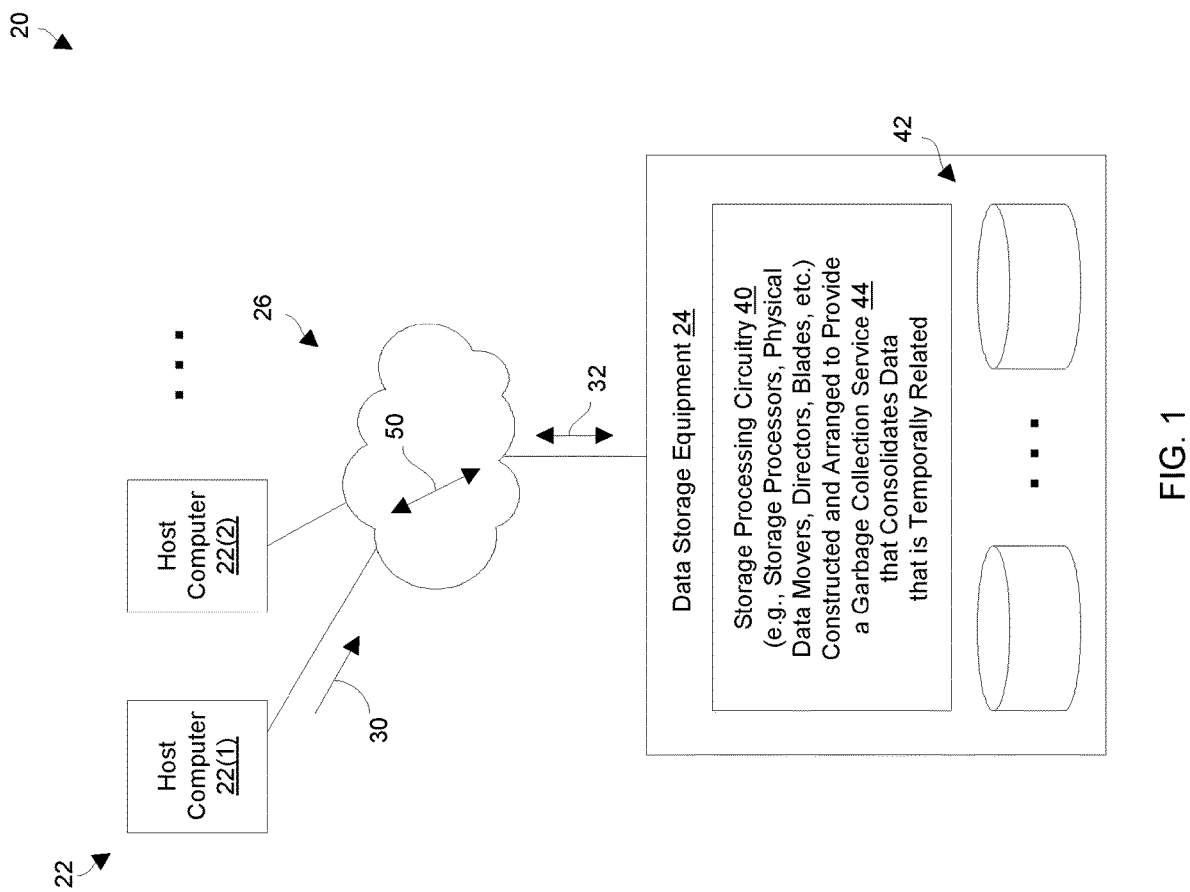
FIG. 1 is a block diagram of a data storage environment which consolidates temporally-related data within log-based storage.

FIG. 1 is a block diagram of a data storage environment 20 which consolidates valid data in a temporally-related manner. The data storage environment 20 includes a set of host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40 and an array of storage devices 42. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 responds to the I/O requests 30 from the host computers 22 by robustly and reliably storing the host data 32 into and retrieving the host data 32 from the array of storage devices 42. Additionally, the storage processing circuitry 40 provides a garbage collection service 44 that consolidates data that is temporally related. Accordingly, the data storage equipment 24 is able to enjoy certain efficiencies and optimizations such as more sequential reads, improved prefetching, and less fragmentation. Furthermore, such operation may provide improvement to other services within the data storage equipment 24 such as deduplication, auto-tiering, etc.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 writes host data 32 to the array of storage devices 42 and reads host data 32 from the array of storage devices 42 in response to the I/O requests 30. Additionally, storage processing circuitry 40 collects valid portions of the host data 32 and coalesces the valid portions of the host data 32 together and stores them in new locations. Such operation frees up memory (e.g., memory containing portions of invalid data) for subsequent use. Since the host data 32 that was initially ingested remains generally together, many subsequent operations work more efficiently such as sequential reads, prefetching, subsequent defragmentation, etc.

One should appreciate that ingested data generally falls into two categories: long-living/stable data and short-living/frequently-updated data. As the time passes, the short-living/frequently-updated data may be modified multiple times and may reside in the last written window or memory segment of log-based secondary storage.

In contrast, the long-living/stable data calmly sits in its original memory segment(s). Accordingly, the garbage collection service 44 can collect this long-living/stable data in the temporal order of its ingestion. As a result, the long-living/stable data will be placed close to each other thus improving access in the future (e.g., improved prefetching, improved sequential access, maintaining the data together when moving the data between storage tiers, etc.). The short-living/frequently-updated data may continue to jump from one window to another and will not be garbage collected until it cools off and falls into the long-living/stable data category. Further details will now be provided with reference to FIG. 2.

Figure 2:
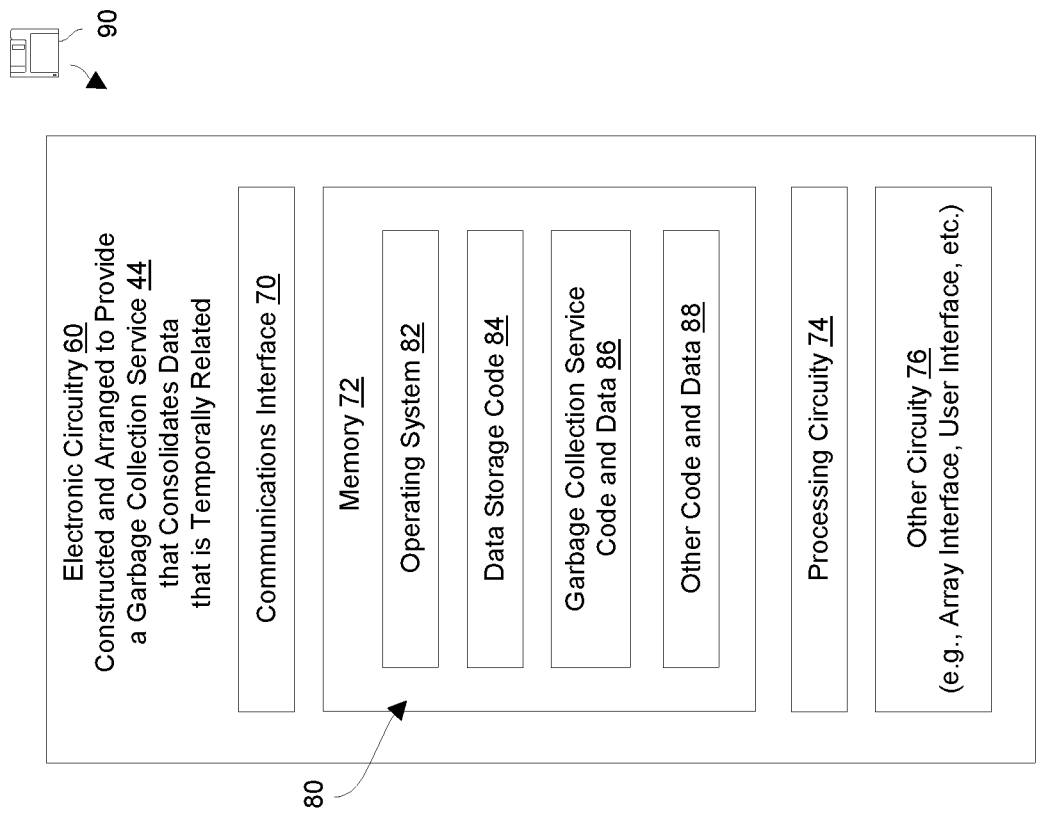
FIG. 2 is a block diagram of data storage equipment of the data storage environment of FIG. 1.

FIG. 2 shows particular details of electronic circuitry 60 which forms the storage processing circuitry 40 of the data storage equipment 24 (also see FIG. 1) that provides a garbage collection service 44 in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the array of storage devices 42 (FIG. 1). The memory 72 stores a variety of software constructs 80 including operating system code 82, data storage code 84, garbage collection service code and data 86, as well as other code and data 88.

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The data storage code 84 refers to the instructions that are involved in routine data storage operations (e.g., write and read operations). The data storage code 84 may include operating parameters, drivers, other metadata, etc. that form one or more portions of the I/O stack, mapping tables, and so on. In some arrangements, the data storage code 84 is tightly integrated with the operating system code 82 (e.g., a kernel).

The garbage collection service code and data 86 refers to specialized instructions that identify valid data that is temporally related, and consolidates that data to free up memory space. In some arrangements, the garbage collection service code and data 86 includes a data order log that holds order information indicating a temporal order for the host data 32. Such order information are then used to identify temporal relationships among the host data 32.

The other code and data 88 refers to various other instructions, parameters, data, etc. For example, the data storage equipment 24 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations as well as perform garbage collection operations to consolidate the host data 32.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 may include a storage drive (or array) interface to communicate with the storage drives 42 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 through 5.

Figure 3:
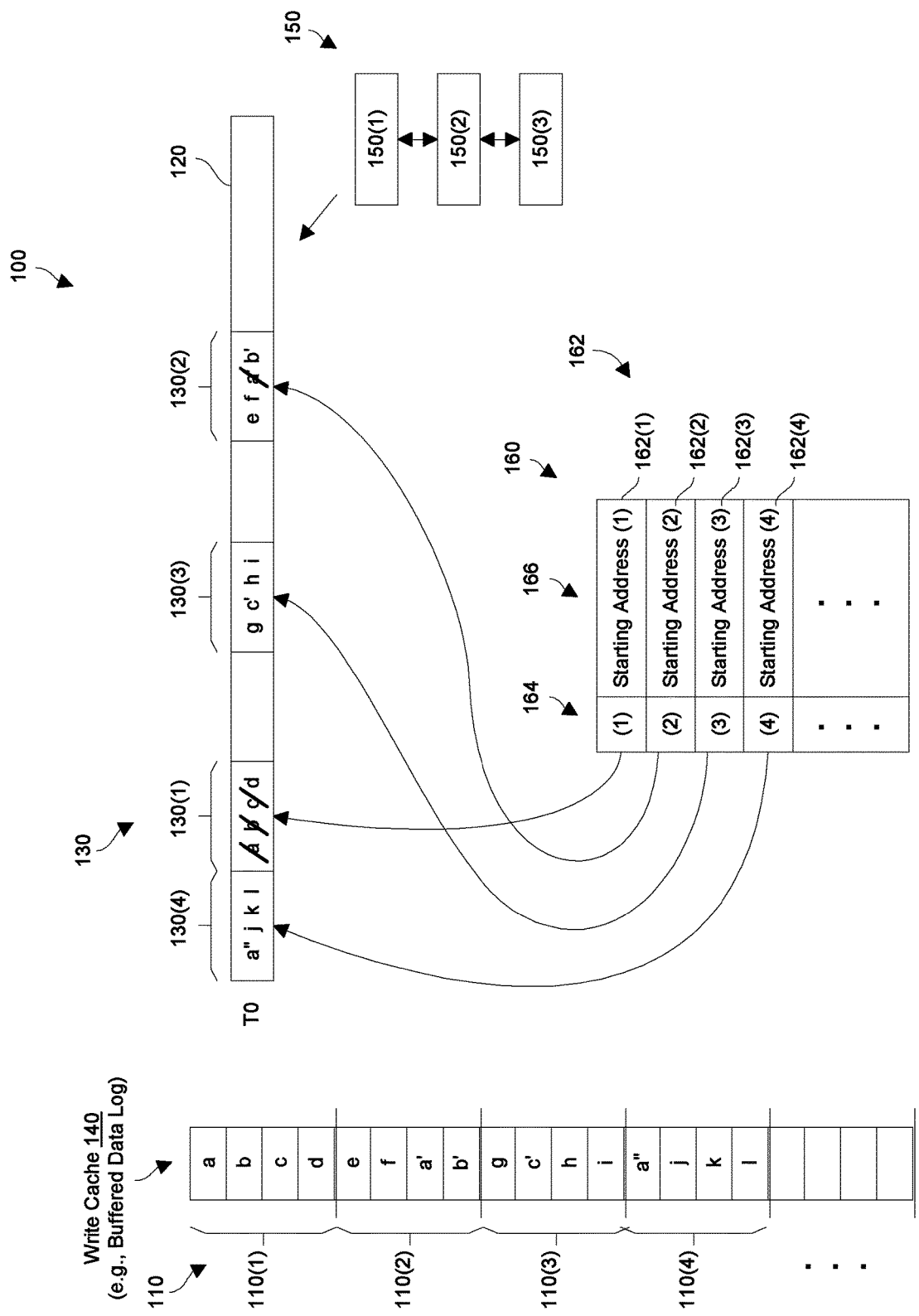
FIG. 3 is a block diagram illustrating particular details of a consolidation process performed by a garbage collection service of the data storage equipment of FIG. 2.
Figure 4:
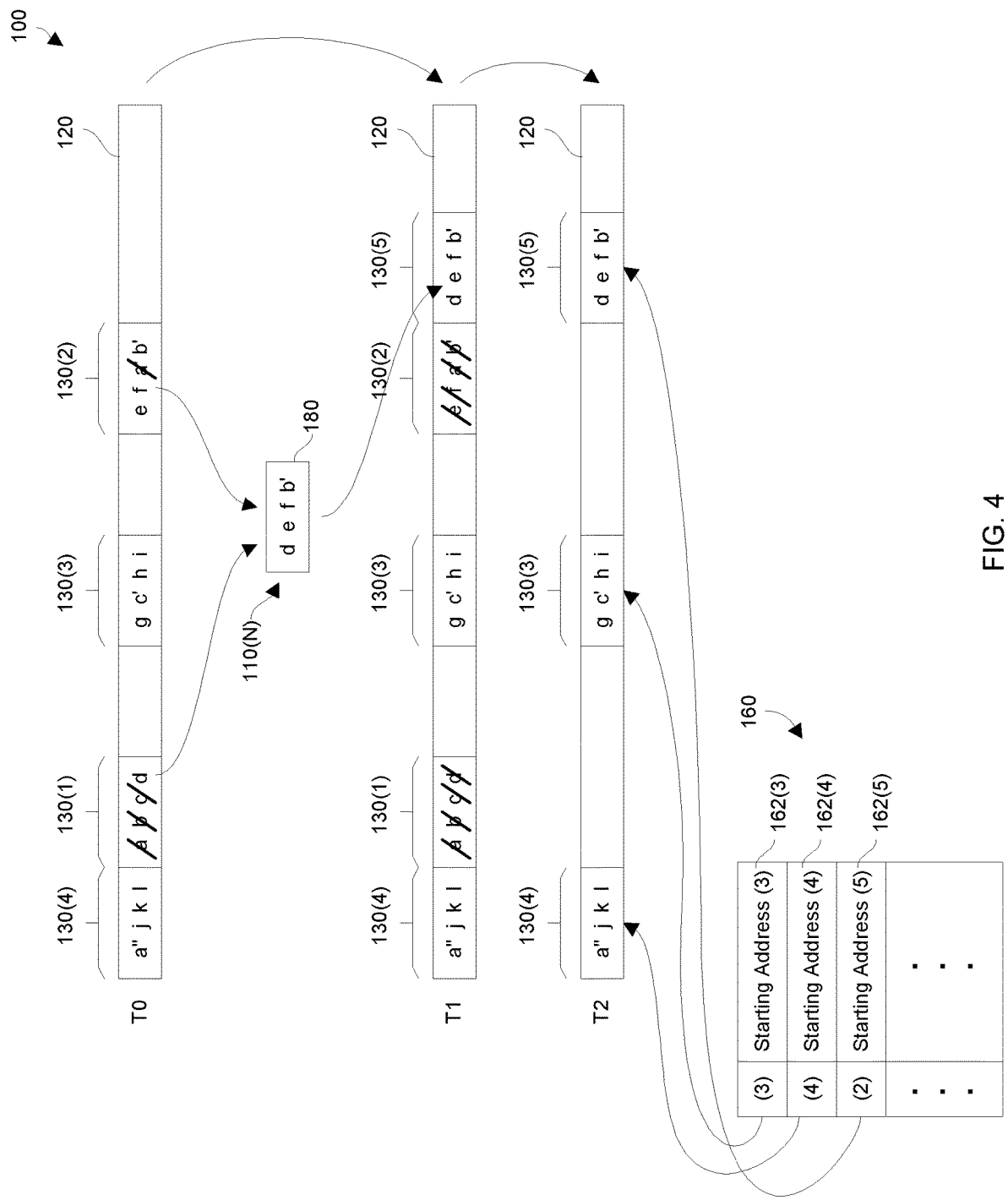
FIG. 4 is a block diagram illustrating further details of the consolidation process.
Figure 5:
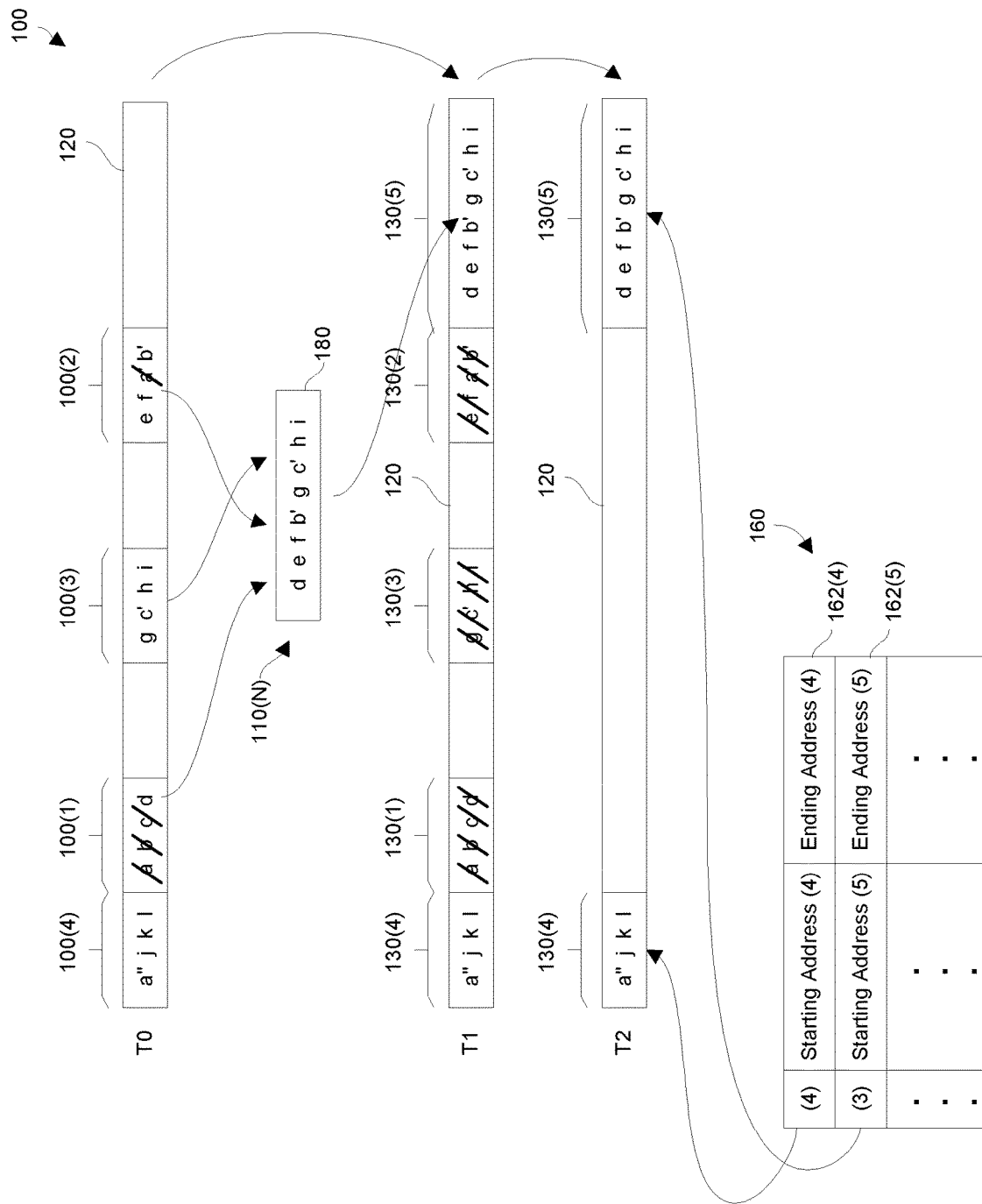
FIG. 5 is a block diagram illustrating yet further details of the consolidation process.

FIGS. 3 through 5 show, in accordance with certain example embodiments, particular storage details of example log-based storage environments 100 which enjoy consolidation of data based on temporal relationships. FIG. 3 shows, by way of example, how groups 110 of data blocks are received in a particular order and stored in log-based secondary storage 120. FIG. 4 shows, in accordance with a particular example embodiment in which the groups 110 of data blocks are stored in memory segments 130 that are the same size, how data blocks are consolidated to free up secondary storage 120. FIG. 5 shows, in accordance with another example embodiment in which the groups 110 of data blocks are stored in memory segments 130 that are of varying size, how data blocks are consolidated to free up memory secondary storage 120.

In these example embodiments, the log-based secondary storage 120 does not need to store data in the manner of a circular buffer. Rather, the data may be stored differently (e.g., based on a set of policies, in the closest adjacent location(s), randomly/arbitrarily, etc.).

With reference initially placed on FIG. 3, as the data storage equipment 24 receives host data 32 to be written to the secondary storage 120 (also see the I/O requests 30 from the host computers 22 in FIG. 1), the data storage equipment 24 collects the host data 32 in a write cache 140 (or front-end log). The data storage equipment 24 then writes this temporarily buffered host data 32 to the secondary storage 120 (also see the array of storage devices 42 in FIG. 1).

It should be understood that the secondary storage 120 may include different tiers 150 of non-volatile memory such as a tier 150(1) of solid state devices, a tier 150(2) of fast magnetic disk drives, and a tier 150(3) of slow magnetic disk drives, etc. Other storage tier configurations are suitable for use as well (e.g., one storage tier 150, two storage tiers 150, four storage tiers 150, etc.). During initial data placement as well as via a background service, the storage processing circuitry 40 may place data among different tiers 150 based on various data placement policies (e.g., based on temperature/access frequency, etc.).

By way of example, suppose that the storage processing circuitry 40 (FIG. 1) of the data storage equipment 24 initially receives a first group 110(1) of data blocks (i.e., blocks "a", "b", "c", and "d"). In response, the storage processing circuitry 40 initially buffers the first group 110(1) of data blocks in the write cache 140.

Eventually, the storage processing circuitry 40 synchronizes the first group 110(1) of data blocks to the log-based secondary storage 120. In particular, the storage processing circuitry 40 writes the first group 110(1) of data blocks to a first memory segment 130(1) within the secondary storage 120, and updates a data order log 160 to indicate when and where the first group 110(1) of data blocks were stored in the secondary storage 120. In particular, the storage processing circuitry 40 adds an entry 162(1) in the data order log 160 to reflect such storage in the first memory segment 130(1).

In some arrangements, the data order log 160 includes entries 162(1), 162(2), 162(3), 162(4), . . . (collectively, entries 162) which indicate the temporal order of the data stored in the secondary storage 120. By way of example only, each entry 162 includes an identifier field 164 that identifies a particular group 110 of data blocks that were stored in the secondary storage 120 at a particular time, and a location field 166 that identifies where the particular group 110 of data blocks is located within the secondary storage 120 (e.g., based on addresses, based on unique block identifiers, etc.).

After the storage processing circuitry 40 stores data blocks "a", "b", "c", and "d" within the secondary storage 120, suppose that the storage processing circuitry 40 receives a second group 110(2) of data blocks. In particular, suppose that the second group 110(2) of data blocks includes data blocks "e", "f", "a'", and "b'", wherein blocks "e" and "f" are new blocks and blocks "a'" and "b'" are modified (or updated) versions of earlier received and stored blocks "a" and "b".

In response to receipt of the second group 110(2) of data blocks, the storage processing circuitry 40 synchronizes the second group 110(2) to the secondary storage 120. In particular, the storage processing circuitry 40 writes the second group 110(2) to a second memory segment 130(2). Additionally, the storage processing circuitry 40 invalidates the original data blocks "a" and "b" in the first memory segment 130(1) (e.g., by updating metadata, also see the slashes "/" in FIG. 3), and adds an entry 162(2) to the data order log 160 to reflect storage in the second memory segment 130(2).

After the storage processing circuitry 40 stores data blocks "e", "f", "a'", and "b'" within the secondary storage 120, suppose that the storage processing circuitry 40 receives a third group 110(3) of data blocks. In particular, suppose that the third group 110(3) of data blocks includes data blocks "g'", "c''", "h'", and "i'", wherein block "c''" is a modified version of earlier received and stored block "c'".

In response to receipt of the third group 110(3) of data blocks, the storage processing circuitry 40 synchronizes the third group 110(3) to the secondary storage 120. In particular, the storage processing circuitry 40 writes the third group 110(3) to a third memory segment 130(3). Furthermore, the storage processing circuitry 40 invalidates the original data block "c" in the first memory segment 130(1), and adds an entry 162(3) to the data order log 160 to reflect storage in the third memory segment 130(3).

Likewise, suppose that the storage processing circuitry 40 receives a fourth group 110(4) of data blocks. In particular, suppose that the fourth group 110(4) of data blocks includes data blocks "a''''", "j'", "k'", and "l'", wherein block "a''''" is a modified version of earlier received and stored block "a'".

In response to receipt of the fourth group 110(4) of data blocks, the storage processing circuitry 40 synchronizes the fourth group 110(4) to the secondary storage 120. In particular, the storage processing circuitry 40 writes the fourth group 110(4) to a fourth memory segment 130(4). Also, the storage processing circuitry 40 invalidates the data block "a'" in the second memory segment 130(2), and adds an entry 162(4) to the data order log 160 to reflect storage in the fourth memory segment 130(4), and so on.

Over time, the storage processing circuitry 40 continues to buffer data within the write cache 140 and then synchronize that data to the secondary storage 120. During such operation, the storage processing circuitry 40 invalidates earlier versions of blocks that have been modified, as well as updates the data order log 160 in order to capture the temporal relationship of the data within the secondary storage 120.

Now, suppose that the garbage collection service 44 (formed by the storage processing circuitry 40) is active and thus in the process of reclaiming memory of the secondary storage 120 for reuse. To this end, the garbage collection service 44 accesses the data order log 160 to determine the temporal relationships of the data within the secondary storage 120, and attempts to keep data that was received at the same time close together based on the temporal relationships. To this end, the garbage collection service 44 accesses the data order log 160 and determines from the entries 162 that the memory segment 130(1) was stored first, the memory segment 130(2) was stored second, and so on.

Next and as shown in FIG. 4, the garbage collection service 44 takes the remaining valid blocks from the oldest memory segments 130 of the secondary storage 120 and consolidates these blocks into a new group 110(N) of data blocks within temporary memory 180. Since the memory segments 130 in FIG. 4 are the same size (e.g., each segment stores four data blocks by way of example), the garbage collection service 44 reads block "d" from the memory segment 130(1) and blocks "e", "f", and "b'" from the memory segment 130(2) into the temporary memory 180 as a new group 110(N) (also see T0 in FIG. 4).

Then, at T1 in FIG. 4, the garbage collection service 44 writes the new group 110(N) of data blocks to a fifth segment 130(5) within the secondary storage 120. Additionally, the garbage collection service 44 invalidates the block "d" in the memory segment 130(1) and the blocks "e", "f", and "b'" in the memory segment 130(2), and adds an entry 162(5) to the data order log 160 to reflect storage in the fifth memory segment 130(5) (e.g., the identifier field 164 of the entry 162(5) indicates that the fifth memory segment 130(5) holds the oldest data). In some arrangements, the temporary memory 180 is a portion of the write cache 140 thus enabling the storage processing circuitry 40 to process the new group 110(N) of data blocks in the same manner as newly received data.

Since all of the blocks in the memory segments 130(1) and 130(2) are invalid, the memory segments 130(1) and 130(2) are now available for reuse (also see T2 in FIG. 4). Accordingly, the garbage collection service 44 has successfully reclaimed additional memory for further log-based storage.

As an alternative to the situation in FIG. 4, suppose that the memory segments 130 within the secondary storage 120 may be variable in size. In this situation and as shown in FIG. 5, suppose that the garbage collection service 44 determines that there is room to storage eight (8) blocks of data contiguously. The garbage collection service 44 then accesses the data order log 160 to determine the temporal relationships of the data within the secondary storage 120, takes the remaining valid blocks from the oldest memory segments 130 of the secondary storage 120 to fill the available room. In particular, the garbage collection service 44 reads block "d" from the memory segment 130(1), blocks "e", "f", and "b'" from the memory segment 130(2), and blocks "g'", "c''", "h'", and "i'" from the memory segment 130(3) into the temporary memory 180 as a new group 110(N) (also see T0 in FIG. 5).

Then, at T1 in FIG. 5, the garbage collection service 44 writes the new group 110(N) of data blocks to a fifth segment 130(5) within the secondary storage 120. Additionally, the garbage collection service 44 invalidates the block "d" in the memory segment 130(1), the blocks "e", "f", and "b'" in the memory segment 130(2), and the blocks "g'", "c''", "h'", and "i'" in the memory segment 130(3). Furthermore, the garbage collection service 44 adds an entry 162(5) to the data order log 160 to reflect storage in the fifth memory segment 130(5) (e.g., the identifier field 164 of the entry 162(5) indicates that the fifth memory segment 130(5) holds the oldest data. In some arrangements and as shown in FIG. 5, the location fields of the entries 162 of the data order log 160 include starting addresses and ending addresses to identify the memory segments 130.

Since all of the blocks in the memory segments 130(1), 130(2), and 130(3) are invalid, the memory segments 130 (1), 130(2), and 130(3) are now available for reuse (also see T2 in FIG. 5). Accordingly, the garbage collection service 44 has successfully reclaimed additional memory for further log-based storage. Further details will now be provided with reference to FIG. 6.

Figure 6:
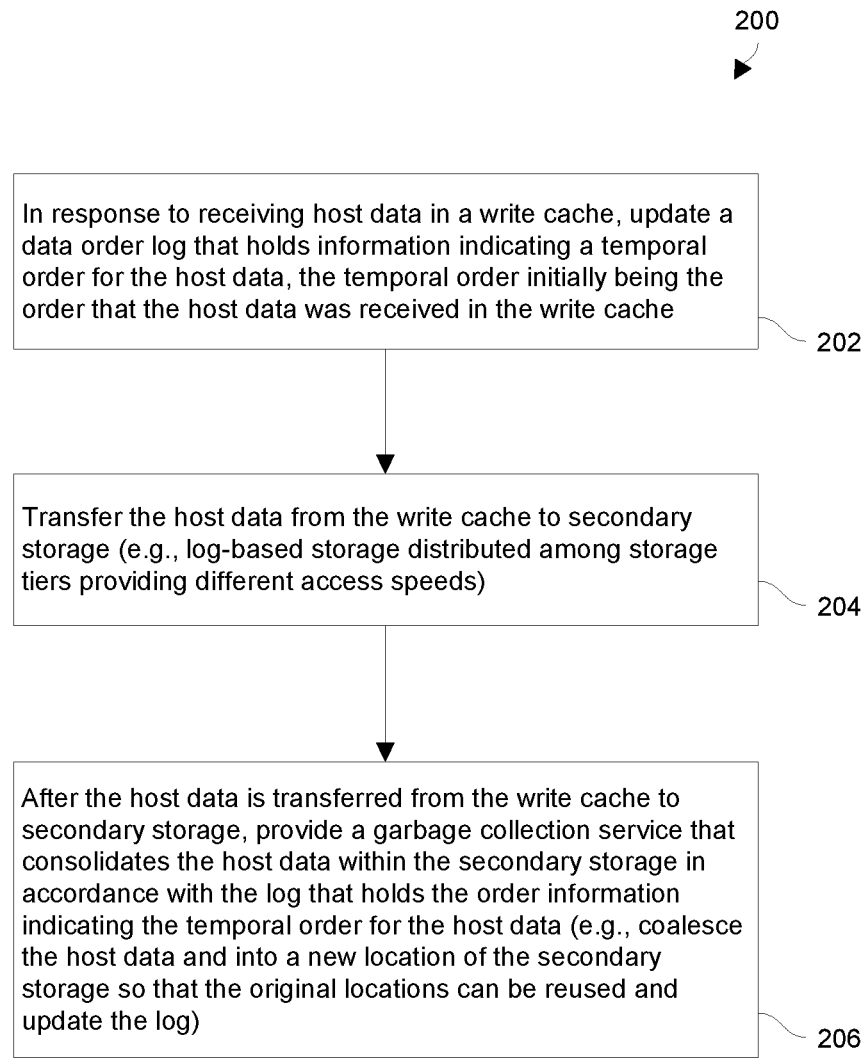
FIG. 6 is a flowchart of a procedure which is performed by the data storage equipment of FIG. 2.

FIG. 6 is a flowchart of a procedure 200 which is performed by the storage processing circuitry 40 when managing data within computerized memory.

At 202, in response to receiving host data in a write cache (or front-end log), the storage processing circuitry 40 updates a data order log that holds order information indicating a temporal order for the host data. The temporal order initially is the order that the host data was received in the write cache.

At 204, the storage processing circuitry 40 transfers the host data from the write cache to secondary storage. As mentioned earlier, the secondary storage may be log-based and distributed among tiers that provide different access speeds.

At 206, after the host data is transferred from the write cache to secondary storage, the storage processing circuitry 40 provides a garbage collection service that consolidates the host data within the secondary storage in accordance with the log that holds the order information indicating the temporal order for the host data. Here, some memory locations within the secondary storage may include fragmented data, i.e., some data is valid but other data is no longer valid. Accordingly, the garbage collection service gathers the remaining valid data and stores that remaining valid data in a new memory location of the secondary storage, as well as updates the log. As a result, all of the data within the original memory locations is no longer valid and the original memory locations may be reused.

As described above, improved techniques are directed to consolidating valid data that is temporally-related. To this end, data blocks belonging to the same time period (i.e., data blocks received around the same time) are purposefully gathered and placed together by a garbage collection service 44. Such operation may be based on a set of entries 162 that initially tracks the blocks using the order that the blocks were initially received and then attempts to keep the blocks together in subsequent consolidation operations over time. Such operation leads to greater efficiencies and optimizations such as more sequential reads, improved prefetching, less fragmentation, and so on. Moreover, such operation provides improvement to other services such as deduplication, auto-tiering, etc.

One should appreciate that the above-described techniques do not merely store data in an abstract sense. Rather, the disclosed techniques involve improvements to the technology of data storage. For example, specialized circuitry (e.g., the storage processing circuitry 40 operating as a garbage collector) is able to collect and store stable data within secondary storage 120 in the temporal order of their ingestion. Accordingly, this stable data is placed close together, which improves subsequent access (e.g., sequential reading of the data, prefetching, etc.). Other data which may jump around in log-based secondary storage may eventually cool and thus become stable data which is then consolidated in this manner as well.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in log-based storage systems, the data is initially buffered before being written to log-based secondary storage. In some arrangements, the operation of writing data to the log-based secondary storage may write data in relatively large portions (e.g., the size may be may be equal to or even larger than a data stripe). As data blocks are rewritten, they are placed to another location (together with temporally-related neighbors in the log-based secondary storage).

To eliminate the space fragmentation and prepare the log-based secondary storage for the placement of new data, a garbage collector service 44 may be used. This garbage collector service 44 scans the log-based secondary storage to identify and consolidate valid blocks thus freeing the original locations for reuse.

It should be further understood that, if the blocks are simply mixed with no regard for temporal relationship, the temporally-related data could be scattered randomly within secondary storage and thus degrade performance. However, with the garbage collector service 44, the valid data can be gathered in the same temporal order that existed during initial ingestion. As the result, the consolidate blocks belong to the same time period and are kept together.

In some arrangements, a log of "windows" is used to store the temporal relationships of the data residing in secondary storage. In particular, the log can contain records with such attributes as: logical unit of storage (LUN) identifier (ID), starting address, ending address, and so on. In certain arrangements, the windows are of the same size and it is unnecessary to store both starting and ending addresses.

In some arrangements, the garbage collector (or space maker) service 44 runs in background and processes the windows in the order they were filled (e.g. consuming idle processor cycles, during times of low data storage activity, etc.). Accordingly, the data blocks are processed in order of arrival or very close to it. Moreover, the temporal order (or locality) of the I/O will be maintained. Thus, the related data blocks can be kept physically close thereby improving performance, e.g., via caching/prefetching, together during deduplication and/or auto-tiering, during sequential reads, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing data within computerized memory, comprising:
   in response to receiving host data in a write cache, updating a data order log that holds order information indicating a temporal order for the host data, the temporal order initially being the order that the host data was received in the write cache;
   transferring the host data from the write cache to secondary storage; and
   after the host data is transferred from the write cache to secondary storage, providing a garbage collection service that consolidates the host data within the secondary storage in accordance with the data order log that holds the order information indicating the temporal order for the host data;
   wherein the consolidated host data is valid data grouped together within the secondary storage in the same temporal order indicated by the data order log.

2. The method as in claim 1, further comprising:
before the host data within the secondary storage is consolidated, modifying at least some of the host data that was transferred from the write cache to the secondary storage.

3. The method as in claim 2, wherein the secondary storage performs log-based storage of the host data;
wherein transferring the host data from the write cache to secondary storage includes storing the host data within a first set of storage locations of the secondary storage; and
wherein modifying at least some of the host data that was transferred from the write cache to the secondary storage includes (i) modifying particular portions of the host data stored within the first set of storage locations of the secondary storage to form modified portions of the host data, (ii) writing the modified portions of the host data to a second set of storage locations of the secondary storage that is different from the first set of storage locations, and (iii) invalidating the particular portions of the host data stored within the first set of storage locations of the secondary storage.

4. The method as in claim 3, wherein, after the particular portions of the host data stored within the first set of storage locations are invalidated, the first set of storage locations continues to store other portions of the host data that are still valid; and
wherein providing the garbage collection service includes consolidating the other portions of the host data that are still valid into consolidated portions of the host data within a third set of storage locations of the secondary storage, the consolidated portions of the host data including the other portions of the host data that are still valid ordered in accordance with the temporal order.

5. The method as in claim 4, wherein consolidating the other portions of the host data that are still valid into the consolidated portions of the host data within the third set of storage locations includes:
reading at least some of the order information from the data order log; and
based on the order information read from the data order log, forming the consolidated portions of the host data from the other portions of the host data that are still valid.

6. The method as in claim 5, wherein consolidating the other portions of the host data that are still valid into the consolidated portions of the host data within the third set of storage locations further includes:
writing the consolidated portions of the host data to the third set of storage locations of the secondary storage, and
invalidating the other portions of the host data from the first set of storage locations.

7. The method as in claim 6, further comprising:
in response to the consolidated portions of the host data being written to the third set of storage locations of the secondary storage, updating the data order log that holds order information indicating the temporal order for the host data, the updated temporal order being the order that the consolidated portions of the host data were written to the third set of storage locations of the secondary storage.

8. The method as in claim 7, wherein the secondary storage includes a first storage tier that provides data access at a first data access speed and a second storage tier that provides data access at a second data access speed that is different from the first data access speed;
wherein the first set of storage locations reside within the first storage tier; and
wherein the third set of storage locations reside within the second storage tier.

9. The method as in claim 7, wherein the data order log includes multiple entries, each entry of the data order log identifying (i) a respective storage location of the first set of storage locations, the second set of storage locations, and the third set of storage locations and (ii) a place within the temporal order for that respective storage location.

10. The method as in claim 9, wherein each storage location of the first set of storage locations, the second set of storage locations, and the third set of storage locations is equal in size; and
wherein the respective storage location identified by each entry of the data order log is identified by an address of the respective storage location.

11. The method as in claim 9, wherein the storage locations of the first set of storage locations, the second set of storage locations, and the third set of storage locations are varying in size; and
wherein the respective storage location identified by each entry of the data order log is identified by a starting address and an ending address of the respective storage location.

12. The method as in claim 1, wherein the write cache and the secondary storage form at least a portion of a memory subsystem of a data storage assembly; and
wherein the method further comprises:
delivering electronic results to a set of host computers in response to input/output (I/O) requests sent by the set of host computers to the data storage assembly to access the host data from the data storage assembly.

13. The method as in claim 12, wherein the write cache receives and stores the host data in a log-based manner.

14. Data storage equipment, comprising:
a communications interface;
memory including a write cache, a data order log, and secondary storage; and
control circuitry coupled to the communications interface and the memory, the memory storing instructions which, when carried out by the control circuitry, cause the control circuitry to:
in response to receiving host data in the write cache through the communications interface, update the data order log which holds order information indicating a temporal order for the host data, the temporal order initially being the order that the host data was received in the write cache,
transfer the host data from the write cache to secondary storage, and
after the host data is transferred from the write cache to secondary storage, provide a garbage collection service that consolidates the host data within the secondary storage in accordance with the data order log that holds the order information indicating the temporal order for the host data;
wherein the consolidated host data is valid data grouped together within the secondary storage in the same temporal order indicated by the data order log.

15. The data storage equipment as in claim 14, wherein the instructions further cause the control circuitry to:
before the host data within the secondary storage is consolidated, modify at least some of the host data that was transferred from the write cache to the secondary storage.

16. The data storage equipment as in claim 14, wherein the write cache and the secondary storage form at least a portion of a memory subsystem of a data storage assembly; and wherein the instructions further cause the control circuitry to:
deliver electronic results to a set of host computers in response to input/output (I/O) requests sent by the set of host computers to the data storage assembly to access the host data from the data storage assembly.

17. The data storage equipment as in claim 16, wherein the write cache receives and stores the host data in a log-based manner.

18. A computer program product having a non-transitory computer readable medium which stores a set of instructions to manage data within computerized memory; the set of instructions, when carried out by computerized circuitry, causing the computerized circuitry to perform a method of:
in response to receiving host data in a write cache, updating a data order log that holds order information indicating a temporal order for the host data, the temporal order initially being the order that the host data was received in the write cache;
transferring the host data from the write cache to secondary storage; and
after the host data is transferred from the write cache to secondary storage, providing a garbage collection service that consolidates the host data within the secondary storage in accordance with the data order log that holds the order information indicating the temporal order for the host data;
wherein the consolidated host data is valid data grouped together within the secondary storage in the same temporal order indicated by the data order log.

19. The computer program product as in claim 18, further comprising:
before the host data within the secondary storage is consolidated, modifying at least some of the host data that was transferred from the write cache to the secondary storage.

20. The computer program product as in claim 18, wherein the write cache and the secondary storage form at least a portion of a memory subsystem of a data storage assembly; and
wherein the method further comprises:
delivering electronic results to a set of host computers in response to input/output (I/O) requests sent by the set of host computers to the data storage assembly to access the host data from the data storage assembly.

\* \* \* \* \*